United States Patent [19]

Ishihara

[11] Patent Number: 4,896,311
[45] Date of Patent: Jan. 23, 1990

[54] DISK APPARATUS

[75] Inventor: Atsushi Ishihara, Yokohama, Japan

[73] Assignee: Kabushiki Kaisha Toshiba, Kawasaki, Japan

[21] Appl. No.: 914,623

[22] Filed: Oct. 2, 1986

[30] Foreign Application Priority Data

Oct. 3, 1985 [JP] Japan ................................ 60-220579

[51] Int. Cl.⁴ ............................................. G11B 21/08
[52] U.S. Cl. ..................................... 369/47; 358/338; 360/25; 360/27; 360/73.03; 369/50; 369/59; 369/124
[58] Field of Search ................... 369/50, 124, 5, 9, 58, 369/54, 53, 47, 48, 111; 358/342, 338; 360/25, 27, 31, 73, 73.03

[56] References Cited

U.S. PATENT DOCUMENTS

| 4,357,635 | 11/1982 | Hasegawa | 360/51 |
| 4,532,621 | 7/1985 | Nakagawa | 369/111 |
| 4,558,375 | 12/1985 | Sontheimer | 369/50 |
| 4,564,867 | 1/1986 | Nakajima | 369/48 |
| 4,751,693 | 6/1988 | Yoshimaru | 369/50 |

FOREIGN PATENT DOCUMENTS

| 0054438 | 6/1982 | European Pat. Off. | 369/111 |
| 2119998 | 11/1983 | United Kingdom | 369/111 |

OTHER PUBLICATIONS

EPO Communication Reference 61P200/wa dated Apr. 22, 1988 for EPO Application 86113695.0-2210.
Abstract of Japanese Patent Application 59-157873, "Retrieving Device for Position of Target Track".
Patent Abstracts of Japan, vol. 7, No. 48 (P-178) [1193], Feb. 24th 1983; & JP-A-57 195 366 (Pioneer) 01-1-2-1982.
Japanese Patent Disclosure (KOKAI) No. 60-117448, M. Yamamuro et al. (transliterated).

Primary Examiner—Steven L. Stephan
Attorney, Agent, or Firm—Finnegan, Henderson, Farabow, Garrett and Dunner

[57] ABSTRACT

An optical disk apparatus reads identification data recorded at a predetermined timing in a predetermined position of a loaded optical disk. The type of the optical disk is judged according to the identification data. That is, a judgment is made as to whether the optical disk is a CAV type, in which the recording/reproduction timing, i.e., the demodulation/modulation frequency, is constant irrespective of the access position on the disk, or whether it is of M-CAV type, in which the recording/reproduction timing, is varied according to the access position. According to the result of judgement, the recording/reproduction timing, with respect to the optical disk, is controlled for recording or reproduction of data. The optical disk apparatus can be used with both types of optical disk.

32 Claims, 5 Drawing Sheets

| CLOCK RATE DATA | NUMBER OF SECTOR | START SECTOR NUMBER | FIRST BLOCK NUMBER |
|---|---|---|---|
| 1 | 40 | 00 | 000 000 |
| 2 | 39 | 15 | 002 459 |
| 3 | 38 | 40 | 005 210 |
| ⋮ | ⋮ | ⋮ | ⋮ |

DISK APPARATUS

BACKGROUND OF THE INVENTION

This invention relates to a disk apparatus and, more particularly, a disk apparatus for reproducing data from a CAV type disk and M-CAV type disk and for recording data thereon.

In a disk apparatus, for example, an optical disk apparatus, an optical disk is used for recording data on a spiral track. Recording or reproduction of data in or from the optical disk is performed by an optical head, which is moved linearly by a linear motor in the radial direction of the optical disk.

The recording and reproduction of data in the optical disk apparatus are usually performed using a CAV (constant angular velocity) type disk or a CLV (constant linear velocity) type disk. In the CAV type disk, the angular velocity of the optical disk is held constant, to ensure steady recording or reproduction and to reduce access time. Further, in the CAV type disk, the recording or reproduction timing, i.e., the demodulation or modulation frequency, is constant. In the CLV type disk, on the other hand, the angular velocity of the optical disk for recording or reproduction is reduced as the optical head is moved toward the outer periphery of the optical disk, to obtain a constant linear velocity of the optical disk track with respect to the optical head. The CLV type disk is capable of high-density recording of data. However, since the angular velocity of the optical disk for recording and reproduction of data is varied with the movement of the optical head in the radial direction of the optical disk, it takes some time until the angular velocity of an optical disk drive motor is stabilized. In addition, the motor cannot be operated at high angular velocity. Therefore, this results in considerably longer access times, and the data transfer rate is inevitably reduced.

To obtain reduced access times, increased recording capacity, and increased data transfer rates, a modified constant angular velocity (M-CAV) system is used, in which the optical disk is rotated at a constant angular velocity while the recording or reproduction timing, i.e., the demodulation or modulation frequency, is varied according to the access position, thus achieving satisfactory recording or reproduction.

The presently available optical disk apparatus, however, are used with either CAV type optical disk or M-CAV type optical disk alone, that is, there is no optical disk apparatus which can be used with both types of optical disks. Accordingly, demand has arisen for a disk apparatus which can be used with optical disks of both these systems.

SUMMARY OF THE INVENTION

The invention has been devised in the light of the above, and it has an object of providing a disk apparatus which can be used with both CAV and M-CAV type disks.

According to the invention, there is provided disk apparatus for reproducing data from both first type disks and second type disks, comprising: means for selectively loading one of first and second type disks, the first type disks being of a type for recording data at a constant frequency irrespective of an access position, the second type disk being of a type for recording data at a frequency modified in accordance with an access position; identification data for identifying the system of the disk being initially recorded at a common frequency as a predetermined frequency and at a predetermined position of a common recording density with respect to the first and second type disks; first reproducing means for reproducing the identification data recorded at the predetermined position from the loaded disk at the predetermined frequency; judging means for receiving the identification data reproduced by the first reproducing means and for judging the identification data to see whether the loaded disk belongs to the first or the second disk type; and second reproducing means receptive to judgement result data from the judgement means and external access position information, for reproducing, when the judgement result data identifies the first type of disk, data recorded at the disk position designated by the access position information at the constant frequency irrespective of the access position and for reproducing, when the judgement result data identifies the second type of disk, data recorded on the disk position designated by the access position information at a frequency modified in accordance with the access position of the second type of disk.

DETAILED DESCRIPTION OF THE PREFERRED EMBODIMENT

Figure 1A:
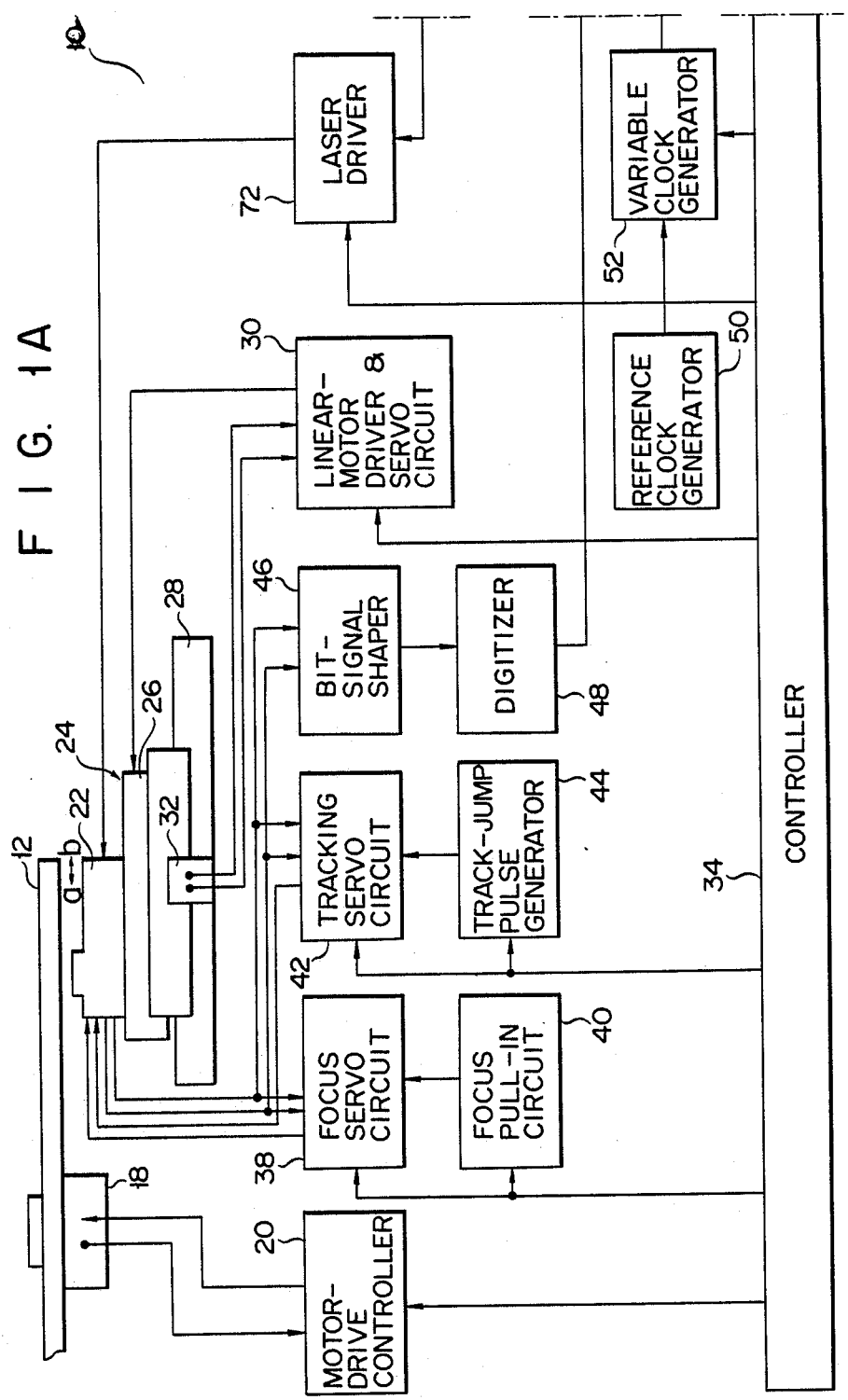
FIGS. 1A and 1B are schematic representations of an optical disk apparatus according to an embodiment of the present invention.
Figure 1B:
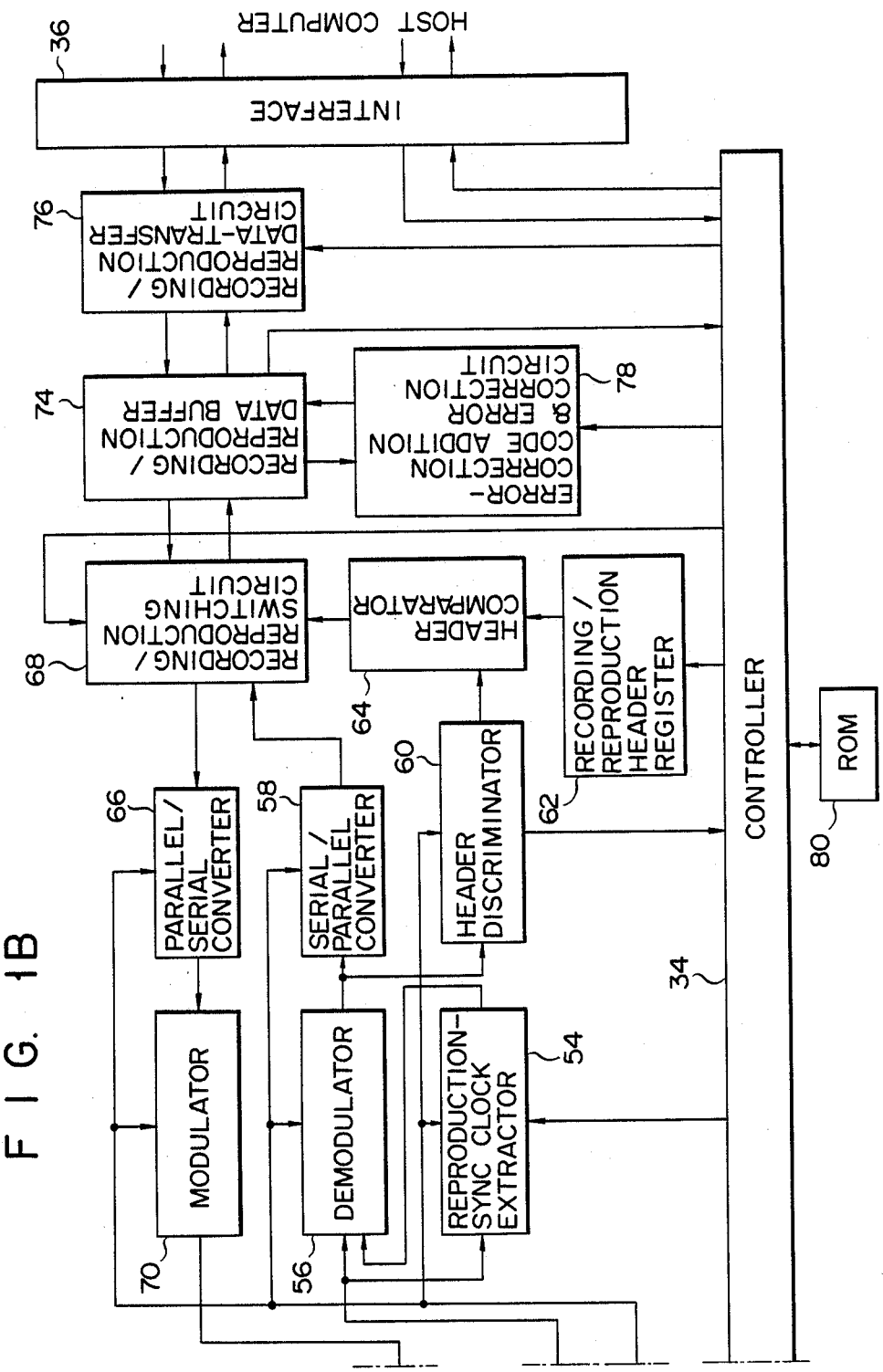
Figure 2:
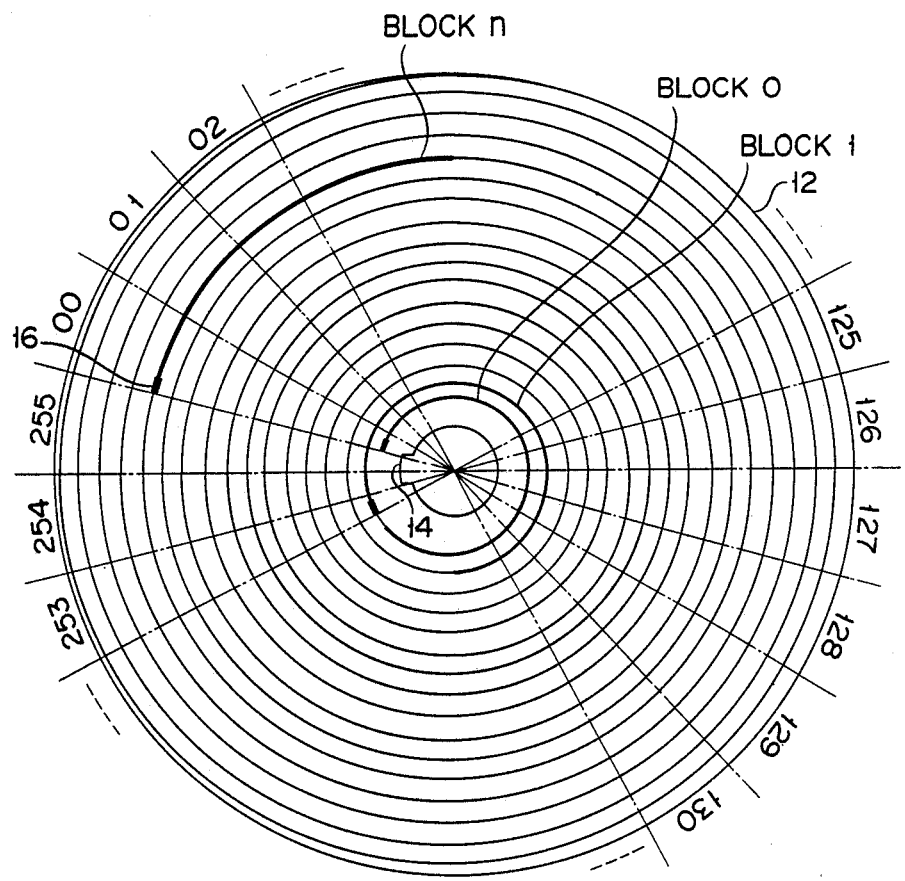
FIG. 2 is a plan view showing an optical disk used with the optical disk apparatus shown in FIG. 1.

FIGS. 1A and 1B are schematic reproductions of an optical disk apparatus according to an embodiment of the present invention. The illustrated optical disk apparatus, which is generally designated by reference numeral 10, is used with optical disk 12 as a recording medium. FIG. 2 shows optical disk 12. This optical disk comprises a circular base made of glass or plastic and a doughnut-like metal coating of a metal such as tellurium or bismuth, formed on the circular base. Optical disk 12 has reference position mark 14, constituted by a notch, formed in the neighborhood of the center of the metal coating. The surface of optical disk 12 is divided into 256 sectors, 0 to 255, with reference position mark 14 as "0" reference.

Optical disk 12 which is used with optical disk apparatus 10, is one of two different types, i.e., the CAV type in which the modulation and demodulation frequency is constant, and the M-CAV type in which the modulation and demodulation frequency is variable. With the CAV type optical disk, the recording density becomes progressively coarser toward the outer periphery of the disk. With the M-CAV type optical disk, on the other hand, the recording density is constant over the entire disk surface. The CAV or M-CAV type optical disk has identification data indicating that the frequency of modulation and demodulation is constant irrespective of the access position or variable according to the access position, the identification-data being recorded in an identification-data recording area which is found in the inner portion of the optical disk. The identification-data recording area is found at the same position on the CAV and M-CAV type optical disks. In other words, the modulation or demodulation frequency is the same and is found at the same recording density position with the CAV and M-CAV type optical disks. As the identification data, a code "00" is recorded in the CAV type and code "01" is recorded in the M-CAV type, for instance.

In the M-CAV type optical disk, a recording/reproduction unit is called a block and each data item to be recorded on or reproduced from every block has a fixed length. Please note that the number of sectors occupied by a block in the M-CAV type optical disk are arranged such that the block on the innermost side of the disk occupies 40 sectors while that on the outermost side occupies 20 sectors, for instance. With the CAV type optical disk, on the other hand, the number of sectors in each block is fixed, for example, 40. Block header 16, which consists of block number, track number, etc., is recorded at the start position of the block at the time of manufacture of optical disk 12, for instance. Further, if a block in the M-CAV type optical disk does not end at a sector-switching position, a block gap is provided, so that each block starts from a sector switching position.

As is shown in FIG. 1, optical disk 12 is driven by motor 18. Motor 18 is a spindle motor, the angular velocity of which is controlled to be constant (600 rpm), by motor-drive controller 20, to be described later.

Optical head 22 is provided in close proximity to the underside of optical disk 12, for recording and reproducing data on and from the disk. Optical head 22 is mounted on DC linear-motor 24. DC linear-motor 24 consists of movable section 26 and stationary section 28. Optical head 22 is secured on movable section 26. DC linear-motor 24 is connected to linear-motor driver & servo circuit 30, so that movable section 26 is driven when DC linear-motor 24 is driven. When movable section 26 is driven, optical head 22 is moved linearly in the radial directions of optical disk 12, as is shown by arrows a and b. The position of movable section 26, i.e., the position of optical head 22, is detected by position detector 32. The result of detection is supplied to linear-motor driver servo circuit 30. Position detector 32 is based on a so-called overlap lattice type detection system, and provides two detection signals of different phases (the phase being different depending on the direction of movement) according to the extent of movement of movable section 26, i.e., the extent of movement of optical head 22.

Optical head 22, which is secured to DC linear-motor 24, consists of a semiconductor laser, a collimator lens, a beam splitter, an objective lens, a focus drive coil for driving the objective lens toward optical disk 12, a tracking drive coil for driving the objective lens in the radial directions of optical disk 12, a focus detector including a pair of photo-detectors for checking whether a laser beam is focused on optical disk 12, and a tracking detector including a pair of photo-detectors for checking whether a data track of optical disk 12 is being tracked, these components being not shown. Each photo-detector provides a detection signal to a corresponding processing and/or driving circuit to be described later, and each processing and/or driving circuit supplies a predetermined voltage to each drive coil and semiconductor laser.

Controller 34 controls optical disk apparatus 10 according to a control signal supplied from an external apparatus, i.e., the host computer (not shown), via interface 36. Linear-motor driver servo circuit 30 drives DC linear-motor 24 according to a desired position signal supplied from controller 34 and also the output signal of detector 32.

Motor-drive controller 20 judges the angular velocity according to a velocity clock from motor 18, and controls the velocity to a preset velocity, by means of controller 34. Focus servo circuit 38 controls the focal point of the objective lens in optical head 22 according to the detection signal from the focus detector in optical head 22. Focus pull-in circuit 40 permits focus servo circuit 38 to effect accurate focusing at the time of switching from a state in which the lens is out-of-focus, to a state in which the lens is in focus. Tracking servo circuit 42 moves the objective lens in the radial directions of optical disk 12 according to a detection signal from the tracking detector in optical head 22, such that the laser beam transmitted through the objective lens in optical head 22 is projected onto the center of the track. Trackjump pulse generator 44 generates a track-jump pulse according to a control signal from controller 34. When this track-jump pulse is supplied, tracking servo circuit 42 interrupts the servo operation and generates a track-jump drive pulse to move the objective lens such that the laser beam is displaced by one track.

Bit-signal shaper 46 shapes the detection signal from the detector in optical head 22. Digitizer 48 digitizes the shaped signal output of bit-signal shaper 46.

. Reference-clock generator 50 generates a reference clock signal. Variable-clock generator 52 generates a clock signal (or reference signal) having a frequency (i.e., a duration) corresponding to clock rate data supplied from controller 34 according to the reference clock signal from reference-clock generator 50. In this case, the frequency of the clock signal generated from variable-clock generator 52 is increased (that is, the duration is reduced) as optical head 22 is moved toward the outer periphery of optical disk 12.

In accordance with a control signal from controller 34, reproduction-sync clock extractor 54 extracts a reproduction-sync clock from data supplied from digitizer 48 whenever the data falls within the frequency range of the clock signal supplied from variable-clock generator 52. Turning to FIG. 1B, demodulator 56 MFM demodulates data supplied from digitizer 48, using the reproduction-sync clock from reproduction-sync clock extractor 54. Serial/parallel converter 58 effects serial-to-parallel conversion of the reproduced signal output of demodulator 56, under the control of the clock signal supplied from variable-clock generator 52.

Header discriminator 60 discriminates header data from the reproduced signal output of demodulator 56. Recording/reproduction header register 62 stores header data which is to be accessed, and is supplied from controller 34. Header comparator 64 checks whether header data stored in recording/reproduction header register 62 and header data supplied from header discriminator 60 coincide. When the two header data compared coincide, it produces a coincidence signal.

Parallel/serial converter 66 effects parallel/serial conversion of the recording data supplied from recording/reproduction switching circuit 68, to be described later, under the control of the clock signal from variable-clock generator 52. Modulator 70 MFM modulates data supplied from parallel/serial converter 66 under control of the clock signal from variable-clock generator 52. Laser driver 72 drives the semiconductor laser in optical head 22 according to the modulation output of modulator 70, to record data on optical disk 12.

When header comparator 64 provides the coincidence signal, recording/reproduction switching circuit 68 supplies reproduction data, subsequent to header data supplied from serial/parallel converter 58, to recording/reproduction data buffer 74, according to a reproduction control signal supplied from controller 34. Further, when header comparator 64 provides the coincidence signal, circuit 68 supplies recording data supplied from recording/reproduction data buffer 74, to parallel/serial converter 66, according to a recording control signal supplied from controller 34.

Recording/reproduction data buffer 74 stores reproduction data from recording/reproduction switching circuit 68 and also stores recording data from recording/reproduction data-transfer circuit 76, to be described later. Error-correction code addition error-correction circuit 78 adds error-correction code to recording data stored in recording/reproduction data buffer 74 and effects error-correction of reproduction data stored in recording/reproduction data buffer 74. Recording/reproduction data-transfer circuit 76 transfers reproduction data supplied from recording/reproduction data buffer 74 to the host computer, via interface 36, and also transfers recording data supplied from the host computer, via interface 36, to recording/reproduction data buffer 74. In order to check the disk mode at the time of starting, reproduction data (identification data) in recording/reproduction data buffer 74 is supplied not to recording/reproduction data-transfer circuit 76, but to controller 34.

Figures 3, 4:
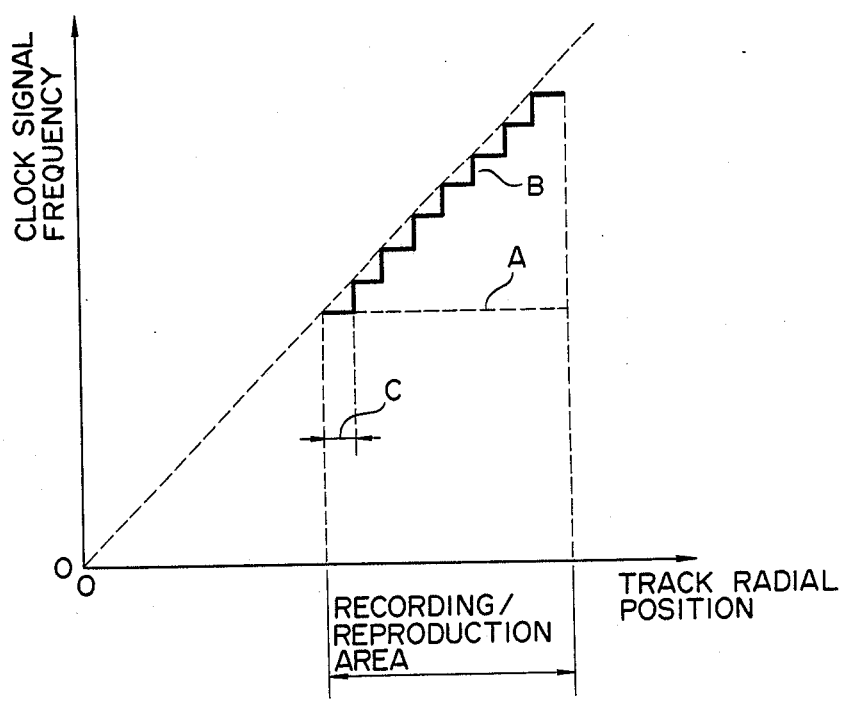
FIG. 3 is a view showing a data table stored in a ROM shown in FIG. 1.
FIG. 4 is a graph showing the relation between the radial position of an optical disk track and the clock signal frequency.

In ROM 80, which serves as a memory circuit, a conversion table as shown in FIG. 3 is stored, in which clock rate data of optical disk 12, the number of sectors in one block at the clock rate, the first block number at the clock rate, and the start sector number in the block are listed for each of the 256 tracks.

To judge the disk mode at the time of the start, controller 34 effects a judgement according to reproduction data (identification data) supplied from recording/reproduction data buffer 74, as to whether the optical disk set in apparatus 10 is CAV or M-CAV type optical data. For example, when code "00" is supplied as identification data from recording/reproduction data buffer 74, controller 34 judges that a CAV type optical disk has been set. When code "01" is supplied as identification data, it is judged that a M-CAV type optical disk has been set.

According to the result of the judgement, controller 34 selects either a first mode, in which the clock signal provided from variable clock generator 52 is constant, irrespective of the accessed position, or a second mode, in which the clock signal is varied according to the accessed position. The first mode is selected in the case of the CAV type disk, and the second mode in the case of the M-CAV type. When the first mode is selected, controller 34 controls variable-clock generator 52 such that generator 52 generates a clock signal having a constant frequency irrespective of the accessed position on optical disk 12, as shown by dashed line A in FIG. 4. When the second mode is selected, controller 34 controls variable-clock generator 52 such that generator 52 generates a clock signal, the frequency of which is varied according to the accessed position on optical disk 12, as shown by solid line B. In the second mode, the clock signal frequency is the same for blocks having the same number of sectors. The frequency thus is varied like a staircase. The discrimination data noted above is stored in recording area C, in which the clock signal frequency is the same in the first and second modes as shown.

In the first mode, when the block number corresponding to the position of recording or reproduction, i.e., the access position, is provided from the host computer via interface 36, controller 34 reads out the access position from ROM 80, and causes accessing by DC linear-motor 24 and optical head 22, with the clock signal frequency held constant. In the second mode, controller 34 reads out clock-rate data and the access position corresponding to the block number, from ROM 80, and causes accessing by DC linear-motor 24 and optical head 22 in a state in which a clock signal corresponding to the clock rate is being provided. The reading (computation) of the clock-rate data and the access position is described in detail in U.S. patent application Ser. No. 704,466 (EPC patent application No. 85101982.8) of T. Yoshimaru entitled "Optical Disk Device" filed on Feb. 22, 1985 and assigned to KABUSHIKI KAISHA TOSHIBA; therefore, a detailed description is not given herein.

Figure 5:
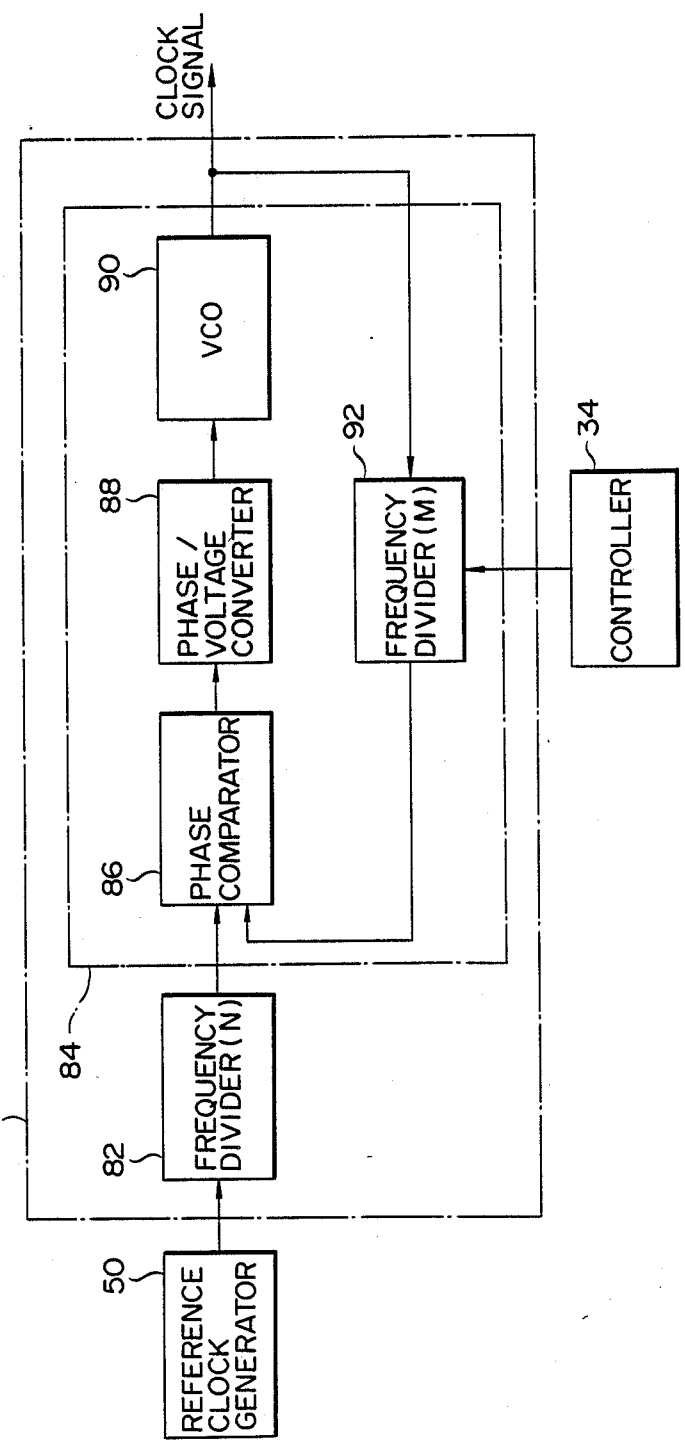
FIG. 5 is a block diagram showing the detailed construction of a variable clock generator shown in FIG. 1.

Variable-clock generator 52 has a construction as shown in FIG. 5. It includes frequency divider 82 and PLL circuit 84. PLL circuit 84 consists of phase comparator 86, phase/voltage converter 88, voltage-controlled oscillator (vco) 90, and frequency divider 92. The frequency of the output of PLL circuit 84, i.e., the clock signal, is controlled through control of the frequency of frequency divider 92 of PLL circuit 84, by controller 34.

The operation of optical disk apparatus 10 having the above construction will now be described.

When optical disk 12 is set in optical disk apparatus 10, controller 34 supplies a control signal to motor-drive controller 20, to drive motor 18, so as to drive optical disk 12 at a predetermined speed. Controller 34 then reads out, from ROM 80, clock-rate data and the access position, i.e., the track number and first sector number, for the block number corresponding to an identifier recording block provided in area C, where the identification data is recorded. Controller 34 supplies the read-out clock-rate data to variable-clock generator 52. Variable-clock generator 52 generates a clock signal at a frequency (i.e., duration) corresponding to clock-rate data supplied from controller 34, using the reference clock signal from reference-clock generator 50, and supplies the generated clock signal to reproduction-sync clock extractor 54, demodulator 56, serial/parallel converter 58, header discriminator 60, parallel/serial converter 66, and modulator 70.

Controller 34 also converts the track number, read out from ROM 80, into a scale value and supplies this value to linear-motor driver & servo circuit 30. Linear-motor driver servo circuit 30 drives DC linear-motor 24 to drive optical head 22 until there occurs a coincidence of the scale value and the position represented by the output of position detector 32. When the movement of optical head 22 is then stopped, the detection signal from the detector in optical head 22 is shaped in shaper 46 and is then digitized in digitizer 48 to be supplied to reproduction-sync clock extractor 54 and demodulator 56. Reproduction-sync clock extractor 54 extracts a reproduction-sync clock from the supplied data and supplies the extracted clock to demodulator 56.

Demodulator 56 MFM demodulates the read-out data supplied from digitizer 48, using the reproduction-sync clock supplied from reproduction-sync clock extractor 54. The demodulated output is supplied via serial/parallel converter 58 to recording/reproduction switching circuit 68 and is also supplied to header discriminator 60. Header discriminator 60 discriminates only header data from the supplied demodulation output, and supplies the header data to controller 34. Controller 34 judges, from the header data, the track in correspondence to optical head 22 and compares this track and the desired track. When it judges that the two compared tracks are spaced apart by several tens of tracks or more, controller 34 causes DC linear-motor 24 to move optical head 22 again. When it judges that the two compared tracks are spaced apart by less than several tens of tracks, controller 34 supplies a control signal to track-jump pulse generator 44, to cause displacement of optical head 22 by a corresponding number of tracks.

When optical head 22 is brought to the position corresponding to the desired track, header discriminator 60 discriminates only header data and supplies this data to header comparator 64. At this time, header data in the desired block, i.e., the identifier recording block provided in recording area C, has been preliminarily stored in recording/reproduction header register 62, by controller 34, and the header data in recording/reproduction header register 62 is supplied to header comparator 64. Header comparator 64 compares the two header data and if the two data coincide, it provides a coincidence signal to recording/reproduction switching circuit 68. In response to this coincidence signal, recording/reproduction switching circuit 68 supplies reproduction data, supplied subsequent to the header data, from serial/parallel converter 58 to recording/reproduction data buffer 74.

The reproduction data in recording/reproduction data buffer 74 is supplied to error-correction code-addition error-correction circuit 78 for error-correction before being supplied to controller 34. When the supplied reproduction data (i.e., identification data) is "00", controller 34 judges that a CAV type optical disk has been set, and selects the first mode. Thus, variable-clock generator 52 is controlled such that it provides a clock signal having a constant frequency, irrespective of the accessed position on optical disk 12, as is shown by dashed line A in FIG. 4.

When the reproduction data from recording/reproduction data buffer 74 is "01", controller 34 judges that a M-CAV type optical disk has been set, and selects the second mode. Variable-clock generator 52 is thus controlled, such that it provides a clock signal, the frequency of which is varied according to the accessed position on optical disk 12, as is shown by solid line B in FIG. 4.

Now, the recording of data in the case when the first mode is selected, will be described. It is assumed that a block number for recording data (i.e., for being accessed) is supplied from the host computer, via interface 36, to controller 34. In this case, controller 34 computes the track and start sector of the desired block, using the conversion table stored in ROM 80. Since the first mode is selected, controller 34 causes variable-clock generator 52 to provide a clock signal at a constant frequency, irrespective of the access position. The constant-frequency clock signal is supplied to reproduction-sync clock extractor 54, demodulator 56, serial/parallel converter 58, header discriminator 60, parallel/serial converter 66, and modulator 70. Further, based on the track number noted above, controller 34 causes the laser beam from optical head 22 to be incident upon the track on which a desired block is located, which operation is the same as that of accessing the identifer recording block provided in recording area C.

At this time, recording data from the host computer has been stored in recording/reproduction data buffer 74, via interface 36 and recording/reproduction data-transfer circuit 76. Further, the recording data is supplied to error-correction code-addition error-correction circuit 78 for error-correction code addition.

When comparator 64 supplies the coincidence signal, with respect to the header data of the desired block, to recording/reproduction switching circuit 68, the recording data of recording/reproduction data buffer 74 is supplied via recording/reproduction switching circuit 68 to parallel/serial converter 66. The serial recording data output of parallel/serial converter 66 is MFM modulated in modulator 70, to be supplied to laser driver 72. Laser driver 72 drives the semiconductor laser in optical head 22 according to the supplied modulation signal, thus causing the recording of data.

Data of other blocks is also recorded in the manner described above. In this case, data is recorded under control of the constant-frequency clock signal, even when the block position is changed.

Now, reproduction of data will be described. It is assumed that a block number for reproduction (i.e., for accessing) is supplied from the host computer, via interface 36, to controller 34. Then, the laser beam of optical head 22 is caused to be incident upon the track on which a desired block is located, which operation is performed in the manner as described before, in conjunction with the recording.

When header comparator 64 supplies the coincidence signal, with respect to the header data of the desired block, to recording/reproduction switching circuit 68, the reproduction data from serial/parallel converter 58 is supplied via recording/reproduction switching circuit 68 to recording/reproduction data buffer 74. The reproduction data stored in recording/reproduction data buffer 74 is supplied to error-correction code-addition & error-correction circuit 78 for error correction, before being transferred, via recording/reproduction data-transfer circuit 76 and interface 36, to the host computer.

Data in other blocks is reproduced in the manner described above. In this case, data is reproduced under control of the constant-frequency clock signal, even when the block position is changed.

Now, recording of data, when the second mode is selected, will be described. It is assumed that a block number for recording (i.e., for accessing) is supplied from the host computer, via interface 36, to controller 34. Then, controller 34 computes the desired block track, start sector, and clock-rate data, using the conversion table in ROM 80. Controller 34 provides clock-rate data to variable-clock generator 52. Variable-clock generator 52 generates a clock signal at a frequency corresponding to the clock-rate data supplied from controller 34, using the reference clock signal from reference clock generator 50. This clock signal is supplied to reproduction-sync clock extractor 54, demodulator 56, serial/parallel converter 58, header discriminator 60, parallel/serial converter 66, and modulator 70. Further, according to the track number noted above, controller 34 causes the laser beam of optical head 22 to be incident upon the track on which a desired block is located, which operation is performed in the manner as described before in connection with the accessing of the identifier recording block provided in recording area C.

At this time, recording data from the host computer has been stored in recording/reproduction data buffer 74, via interface 36 and recording/reproduction data-transfer circuit 76. In addition, the recording data is supplied to error-correction code-addition error-correction circuit 78 for error-correction code addition.

When comparator 64 supplies the coincidence signal, with respect to the desired block track, to recording/reproduction switching circuit 68, the recording data in recording/reproduction data buffer 74 is supplied via recording/reproduction switching circuit 68 to parallel/serial converter 66. The serial recording data output of parallel/serial converter 66 is MFM modulated in modulator 70, to be supplied to laser driver 72. Laser driver 72 drives the semiconductor laser in optical head 12 according to the supplied modulation signal, thus effecting data-recording.

Data in other blocks are recorded in the manner described above. In this case, data is recorded, under control of a clock signal, at a frequency which is increased with changes in the block position toward the outer periphery of the disk.

Now, reproduction of data will be described. It is assumed that a block number for recording (i.e., for accessing) is supplied from the host computer, via interface 30, to controller 34. Then, as in the recording mode, controller 34 reads out clock-rate data for that block and causes variable-clock generator 52 to generate a clock signal at a frequency corresponding to the clock-rate data. This clock signal is supplied to reproduction-sync clock extractor 54, demodulator 56, serial/parallel converter 58, header discriminator 60, parallel/serial converter 66, and modulator 70. Further, as in the recording mode, the laser beam of optical head 22 is incident upon the track on which a desired block exists.

When header comparator 64 provides the coincidence signal, with respect to the header data of the desired block, to recording/reproduction switching circuit 68, the reproduction data from serial/parallel converter 58 is supplied via recording/reproduction switching circuit 68 to recording/reproduction data buffer 74. The reproduction data stored in recording-/reproduction data buffer 74 is supplied to error-correction code-addition & error-correction circuit 78 for error correction, before being transferred, via recording/reproduction data-transfer circuit 76 and interface 36, to the host computer.

Data in other blocks is reproduced in the manner described above. In this case, data is reproduced under control of a clock signal having a frequency which is increased with changes in the block position toward the outer periphery of the disk.

As has been described in the foregoing, with optical disk apparatus 10 according to the present invention, a clock signal at a predetermined frequency is supplied to modulator means and demodulator means at the time of starting (initial setting) when optical disk 12 is set, and discrimination data indicative of whether the clock signal frequency is constant or variable is read out from a predetermined position, i.e., the identifier recording block provided in recording area C of the optical disk, whereby recording or reproduction is performed under control of a clock signal, the frequency of which is either constant or variable according to the access position of optical disk 12, according to the read-out identification data. Thus, it is possible to accomodate both CAV and M-CAV type optical disks.

Area C, where the identification data is recorded, may be any area, so long as the recording density therein is the same with the CAV and M-CAV type optical disks. Therefore, the angular velocity of the motor may be different between the first and second modes, over an area where the recording density is the same. In this case, the prior are CLV type optical disk may also be accommodated.

What is claimed is:

1. A disk apparatus for reproducing data from both a first type disk and a second type disk, said first type disk recording data at a constant first frequency irrespective of a radial location of said data on said first type disk, said second type disk recording data at a frequency modified as a function of a radial location of said data on said second type disk, said first type disk and said second type disk having identification data for identifying the type of the disk, said disk apparatus comprising:
   means for rotating a disk;
   first reproducing means for reproducing said identification data recorded on said rotated disk and for determining whether said rotated disk is a first type disk or a second type disk; and
   second reproducing means for reproducing data recorded on said rotated disk at said constant first frequency irrespective of the radial location of the data on said rotated disk when said first reproducing means determines that said rotated disk is said first type disk, and for reproducing data recorded on said rotated disk at said frequency modified as a function of the radial location of said data when said first reproducing means determines that said rotated disk is said second type disk, said modified frequency being a gradually increasing stepwise function of the location of the recorded data measured radially from the inside of said second type disk to the outside thereof.

2. The disk apparatus according to claim 1, wherein the second type disk includes a plurality of data storage locations in the radial direction of the disk, and said modified frequency is gradually and stepwise increased, with said first frequency as a reference.

3. The disk apparatus according to claim 2, wherein said second reproducing means comprises a head for reading data recorded on said rotated disk, a demodulator for demodulating, using a demodulating frequency, the data read by said head, modifying means for modifying a demodulating frequency of said demodulator, and control means for controlling said modifying means,
   when said first reproducing means determines that said rotated disk is said first type disk, said control means controls said modifying means to cause the demodulating frequency of said demodulator to be said constant first frequency, and
   when said first reproducing means determines that said rotated disk is said second type disk, said control means controls said modifying means to cause the demodulating frequency of said demodulator to be the frequency modified as a function of the radial location of the data on said rotated disk.

4. The disk apparatus according to claim 3, wherein said control means supplies demodulation frequency data to said modifying means in accordance with the determination made by said first reproducing means, said modifying means generates a demodulation timing signal of a predetermined frequency when said disk is a first type disk or a modified frequency when said disk is a second type disk, on the basis of the demodulation frequency data, and said demodulator demodulates data supplied from said head according to the demodulated timing pulse signal.

5. The disk apparatus according to claim 4, wherein said modifying means comprises:
- a variable clock generator including a Phase Locked Loop (PLL) circuit comprising a loop of a phase comparator, a phase-to-voltage converter, a voltage-controlled oscillator, and a frequency divider, and
- a reference clock generator for supplying a reference clock to said variable clock generator, and wherein a frequency of said demodulation timing pulse signal, which is an output of the voltage-controlled oscillator in the PLL circuit, is controlled by controlling the output frequency of said frequency divider, on the basis of the demodulation frequency data supplied from said control means.

6. The disk apparatus according to claim 4, wherein said control means includes memory means for storing a plurality of demodulation frequency data corresponding to an equal number of said locations in the radial direction of the disk for said second type disk, and when the determination obtained by said first reproducing means identifies that said rotated disk is said second type disk, demodulation frequency data corresponding to the radial location of the data on said rotated disk is read from said memory means and is supplied to said modifying means.

7. The disk apparatus according to claim 6, wherein said first and second type disks have a predetermined number of continuous blocks, said memory means stores demodulation frequency data with respect to a plurality of block groups, including a predetermined number of blocks, and said radial location of the data corresponds to said block groups.

8. The disk apparatus according to claim 7, wherein said predetermined frequency is said constant first frequency. frequency modified as a function of a radial location of the recorded data when said rotated disk is said second type disk.

9. A disk apparatus for recording data to both a first type disk and a second type disk, said first type disk recording data at a constant first frequency irrespective of the radial location of the data on said disk, said second type disk recording data at a second frequency modified as a function of a radial location of the data on said disk, said first type disk and said second type disk having identification data to identify the type disk, said disk apparatus comprising:
- means for rotating a disk;
- means for reproducing said identification data on said rotated disk and for determining whether said rotated disk is said first type disk or said second type disk; and
- means for recording data to said rotated disk at a constant first frequency irrespective of the radial location of data on said disk when said means for determining indicates that said rotated disk is said first type disk, and for recording data to said rotated disk at a frequency modified as a function of a radial location of the data on said disk when said means for determining indicates that said rotated disk is said second type disk, said modified second frequency being gradually increased stepwise, as the data location radially increases in distance from the inside of said second type disk to the outside thereof.

10. The disk apparatus according to claim 9, wherein
the second type disk includes a plurality of data recording locations in the radial direction of the disk, and from the inside toward the outside of the second type disk said modified frequency is gradually and stepwise increased, with said first frequency as a reference, as the radial distance of said data location increases.

11. The disk apparatus according to claim 10, wherein
said recording means comprises a head for recording data to said rotated disk, a modulator for modulating the data which is to be supplied to said head and to be recorded to said rotated disk, modifying means for modifying a modulating frequency of said modulator, and control means for controlling said modifying means, when said means for determining identifies that said rotated disk is said first type disk, said control means controls said modifying means to cause the modulating frequency of said modulator to be modified to said constant first frequency, and when said means for determining identifies that said rotated disk is said second type disk, said control means controls said modifying means to cause the modulating frequency of said modulator to be said second frequency modified in accordance with the data location in the radial direction of the disk.

12. The disk apparatus according to claim 11, wherein
said control means supplies modulation frequency data to said modifying means in accordance with the determination obtained by said means for determining, said modifying means generates a modulation timing signal of said predetermined first or modified frequency on the basis of the modulation frequency data, and said modulator modulates data to be recorded by said head by the modulated timing pulse signal.

13. The disk apparatus according to claim 12, wherein
said modifying means comprises:
- a variable clock generator including a PLL circuit comprising a loop of a phase comparator, a phase-to-voltage converter, a voltage-controlled oscillator, and a frequency divider, and
- a reference clock generator for supplying a reference clock to said variable clock generator, and
- a frequency of said demodulation timing pulse signal, which is an output of the voltage-controlled oscillator in the PLL circuit, is controlled by controlling the output frequency of said frequency divider on the basis of the modulation frequency data supplied from said control means.

14. The disk apparatus according to claim 12, wherein said control means includes memory means for storing a plurality of modulation frequency data corresponding to an equal number of the data locations in the radial direction of the disk for the second type disk, and when said means for determining identifies that said rotated disk is said second type disk, modulation frequency data corresponding to the data location in said radial direction of the disk is read out of said memory means and is supplied to said modifying means.

15. The disk apparatus according to claim 14, wherein said disks have a predetermined number of continuous blocks, said memory means stores modulation frequency data with respect to a plurality of block groups, including a predetermined number of blocks, and said data locations correspond to said block groups.

16. The disk apparatus according to claim 15, wherein said predetermined frequency is said constant first frequency.

17. A method for reproducing data from both a first type disk and a second type disk, said first type disk recording data at a constant first frequency irrespective of a radial location of data on said first type disk, said second type disk recording data at a second frequency modified as a function of a data location measured in a radial direction of said second type disk, said first type disk and said second type disk having identification data for identifying the type disk, said method comprising the steps of:

rotating a disk at a predetermined rotation speed;

reproducing said identification data recorded on said rotated disk to determine whether said rotated disk is said first type disk or said second type disk;

reproducing data recorded on said rotated disk at said constant first frequency irrespective of the radial location of data on said rotated disk when said rotated disk is said first type disk; and reproducing data recorded on said rotated disk at said second frequency modified as a function of the radial location of data on said rotated disk when said rotated disk is said second type disk, by gradually increasing said modified frequency stepwise, as the location of the data increases radially from the inside of said second type disk to the outside thereof.

18. The method according to claim 17, wherein the second type disk includes a plurality of data locations in the radial direction of the disk, and said second frequency is gradually and stepwise increased with a predetermined frequency as a reference.

19. The method according to claim 18, wherein said data reproduction is performed by reproducing means comprising a head for reading data recorded on said rotated disk, a demodulator for demodulating the data read by said head, modifying means for modifying a demodulating frequency of said demodulator, and control means for controlling said modifying means, when said rotated disk is said first type disk, said control means controls said modifying means to cause the demodulating frequency of said demodulator to be modified to said constant first frequency, and when said rotated disk is said second type disk, said control means controls said modifying means to cause the demodulating frequency of said demodulator to be equal to the second frequency modified in accordance with the data location in the radial direction of the disk.

20. The method according to claim 19, wherein said control means supplies demodulation frequency data corresponding to the type of said rotated disk to said modifying means in accordance with the type of said rotated disk, said modifying means generates a demodulation timing signal of said predetermined or second frequency on the basis of said demodulation frequency data, and said demodulator demodulates data supplied from said head by the demodulated timing pulse signal.

21. The method according to claim 20, wherein said modifying means includes:

a variable clock generator including a PLL circuit comprising a loop of a phase comparator, a phase-to-voltage converter, a voltage-controlled oscillator, and a frequency divider, and a reference clock generator for supplying a reference clock to variable clock generator, and a frequency of said demodulation timing pulse signal, which is an output of the voltage-controlled oscillator in the PLL circuit, is controlled by controlling the output frequency of said frequency divider, on the basis of said demodulation frequency data supplied from said control means.

22. The method according to claim 20, wherein said control means includes memory means for storing a plurality of demodulation frequency data corresponding to an equal number of data locations in the radial direction of said second type disk, and when said rotated disk is said second type disk, demodulation frequency data corresponding to the data location in the radial direction of said rotated disk is read from said memory means and is supplied to said modifying means.

23. The method according to claim 22, wherein said disks have a predetermined number of continuous blocks, said memory means stores demodulation frequency data with respect to a plurality of block groups, including a predetermined number of blocks, and said area in the radial direction of the disk corresponds to said block groups.

24. The method according to claim 23, wherein said predetermined frequency is said constant first frequency.

25. A method for recording data to both a first type disk and a second type disk, said first type disk recording data at a constant first frequency irrespective of a radial location of data on the disk, said second type disk recording data at a second frequency modified as a function of the radial location of the data on the disk, said first type disk and said second type disk having identification data for identifying the type disk, said method comprising the steps of:

rotating a disk at a predetermined rotation speed;

reproducing said identification data recorded on said rotated disk;

determining whether said rotated disk is said first type disk or said second type disk;

recording data to said rotated disk at said constant first frequency irrespective of the radial location of data on said rotated disk when said rotated disk is said first type disk; and recording data to the rotated disk at said second frequency modified as a function of the radial location of data on said rotated disk when said rotated disk is said second type disk, said second frequency being gradually increased stepwise, as the recorded data location increases radially from the inside of said second type disk to the outside thereof.

26. The method according to claim 25, wherein
the second type disk includes a plurality of data locations in the radial direction of the disk, and
from the inside toward the outside of the second type disk said second frequency is gradually and stepwise increased with a predetermined frequency as a reference.

27. The method according to claim 26, wherein
said data recording is performed by a recording means comprising a head for recording data to said rotated disk, a modulator for modulating the data which is to be supplied to said head and to be recorded on said rotated disk, modifying means for modifying a modulating frequency of said modulator, and control means for controlling said modifying means, when said rotated disk is said first type disk, said control means controls said modifying means, to cause the modulating frequency of said modulator to be modified to said constant first frequency, and when said rotated disk is said second type disk, said control means controls said modifying means, to cause the modulating frequency of said modulator to be equal to the second frequency modified in accordance with the data location in the radial direction of the disk.

28. The method according to claim 27, wherein
said control means supplies modulation frequency data corresponding to the type of said rotated disk to said modifying means in accordance with the type of said rotated disk, and further comprising generating a modulation timing signal of said predetermined or second frequency by said modifying means on the basis of the modulation frequency data, and modulating, in said modulator, data to be supplied to said head by the modulated timing pulse signal.

29. The method according to claim 28, wherein said modifying means comprises:
a variable clock generator including a PLL circuit comprising a loop of a phase comparator, a phase-to-voltage converter, a voltage-controlled oscillator, and a frequency divider, and
a reference clock generator for supplying a reference clock to said variable clock generator, and
a frequency of said demodulation timing pulse signal, which is an output of the voltage-controlled oscillator in the PLL circuit, is controlled by controlling the output frequency of said frequency divider, on the basis of the modulation frequency data supplied from said control means.

30. The method according to claim 28, wherein
said control means includes memory means for storing a plurality of modulation frequency data corresponding to an equal number of data locations in the radial direction of the disk for said second type disk, and when said rotated disk is said second type disk, modulation frequency data corresponding to the data location in the radial direction of the disk is read from said memory means and is supplied to said modifying means.

31. The method according to claim 30, wherein
said disk has a predetermined number of continuous blocks,
said memory means stores modulation frequency data with respect to a plurality of block groups, including a predetermined number of blocks, and
said data location in the radial direction of the disk corresponds to said block groups.

32. The method according to claim 31, wherein said predetermined frequency is said constant first frequency.

* * * * *